United States Patent
Barsoum et al.

(10) Patent No.: US 9,813,600 B2
(45) Date of Patent: Nov. 7, 2017

(54) MULTI-CAMERA VIEW SELECTION BASED ON CALCULATED METRIC

(71) Applicant: Microsoft Corporation, Redmond, WA (US)

(72) Inventors: Emad Barsoum, Sammamish, WA (US); Tommer Leyvand, Seattle, WA (US); Spencer Perreault, Bellevue, WA (US); Robert Smith, Seattle, WA (US); Michael Hall, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 421 days.

(21) Appl. No.: 14/247,334

(22) Filed: Apr. 8, 2014

(65) Prior Publication Data

US 2015/0288866 A1    Oct. 8, 2015

(51) Int. Cl.
*H04N 5/33* (2006.01)
*H04N 5/232* (2006.01)
*H04N 5/235* (2006.01)

(52) U.S. Cl.
CPC ......... *H04N 5/232* (2013.01); *H04N 5/23293* (2013.01); *H04N 5/2351* (2013.01); *H04N 5/33* (2013.01)

(58) Field of Classification Search
CPC .................................................. H04N 5/232
USPC ......................................................... 348/164
See application file for complete search history.

(56) References Cited

U.S. PATENT DOCUMENTS

| | | | |
|---|---|---|---|
| 6,359,647 B1 | 3/2002 | Sengupta et al. | |
| 6,972,787 B1 | 12/2005 | Allen et al. | |
| 8,395,653 B2 | 3/2013 | Feng et al. | |
| 2011/0193967 A1* | 8/2011 | Matsumoto | G03B 7/18 348/164 |
| 2014/0160283 A1* | 6/2014 | Hofman | G06K 9/209 348/143 |

OTHER PUBLICATIONS

Valera, et al., "Intelligent Distributed Surveillance Systems: A Review", In IEE Proceedings Vision, Image and Signal Processing, vol. 152, Issue 2, Apr. 8, 2005, 13 pages.
(Continued)

*Primary Examiner* — Richard Torrente
(74) *Attorney, Agent, or Firm* — Law Offices of Richard Chi; Richard Chi

(57) ABSTRACT

Techniques for automatically selecting from amongst multiple camera views available in a multi-camera system. In an aspect, one or more metrics are calculated for multiple camera views. The metrics may be used to identify one or more of the camera views as fulfilling a condition, in response to which a particular one of the camera views may be selected for display. For example, in a "select-better-view" strategy, the camera view associated with a more optimal image (e.g., better lighting, or absence of occlusion) is selected for display. In a "flag-diagnostic-view" strategy, the camera view associated with a less optimal image is displayed, e.g., to indicate that a particular camera may require user attention. Specific techniques for calculating metrics are further disclosed.

14 Claims, 17 Drawing Sheets

(56) References Cited

OTHER PUBLICATIONS

Lee, et al., "Adaptive Camera Assignment and Hand-Off Algorithm in Multiple Active Camera Surveillance System", In Proceedings of the 9th International Conference on Machine Learning and Cybernetics, Jul. 11, 2010, 6 pages.

"Selecting the CCTV Security System That is Right for You", Published on: Aug. 5, 2007, Available at: http://www.voltek.co.uk/cctv-guide.asp.

Chen, et al., "An Adaptive Learning Method for Target Tracking across Multiple Cameras", In IEEE Conference on Computer Vision and Pattern Recognition, Jun. 23, 2008, 8 pages.

* cited by examiner

"Select-better-view"

"Flag-diagnostic-view"

"Select-IR-view"

MULTI-CAMERA VIEW SELECTION BASED ON CALCULATED METRIC

BACKGROUND

Field

The disclosure relates to view selection for multi-camera systems.

Background

Systems employing multiple cameras are found in a wide range of applications. For example, multiple cameras may enable a user interface for detecting and identifying a user's gestures in a computing system, e.g., a video gaming or other personal computing application. Alternatively, multiple cameras may be employed in a video surveillance system, e.g., to monitor an extended field of view. In systems with multiple cameras, a particular camera may have capabilities or a field of view more suitable in a given situation than other cameras in the system.

For example, in a system employing both a color camera and an infrared camera, the color camera may afford higher resolution in normal lighting conditions, while the infrared camera may be more suitable in low light conditions. In another scenario, when each camera provides a different perspective view of a single scene, some cameras may have an obstructed (or "occluded") view, thereby rendering other cameras of the system more suitable for capturing an image of the scene.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, various aspects of the subject matter described herein are directed towards techniques for automatically selecting from amongst a plurality of camera views available in a multi-camera system. In one aspect, an apparatus includes a first camera interface for receiving a first camera signal and a second camera interface for receiving a second camera signal. A metric calculation block is configured to calculate at least one metric from the first camera signal and from the second camera signal. A selection block is further configured to generate a control signal indicating selection of a camera view for display based on the at least one calculated metric for each camera signal.

In one aspect, a metric may be calculated for each camera view based on a detected brightness, or a detected depth of objects in the camera view. The metrics may be used to determine whether one camera view is more optimal for display than another.

In one aspect, responsive to such a determination, various strategies may be employed for selecting a camera view to display. For example, a "select-better-view" strategy may select the more optimal camera view for display. A "flag-diagnostic-view" strategy may select the less optimal camera view for display, e.g., a camera view in which a significant occlusion is present.

Other advantages may become apparent from the following detailed description and drawings.

DETAILED DESCRIPTION

Various aspects of the technology described herein are generally directed towards a camera view selection technology that dynamically determines an optimal camera view for display in a multi-camera system. The technology may be used in real time, and is robust to variations in environmental conditions, camera capability, and obstructions.

It should be understood that any of the examples herein are non-limiting. For example, exemplary metrics, condition determination functions, and camera view selection strategies are described, but any other techniques for performing similar functions may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways to provide benefits and advantages in multi-camera systems in general.

The detailed description set forth below in connection with the appended drawings is intended as a description of exemplary aspects of the invention and is not intended to represent the only exemplary aspects in which the invention can be practiced. The term "exemplary" used throughout this description means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Figure 1:
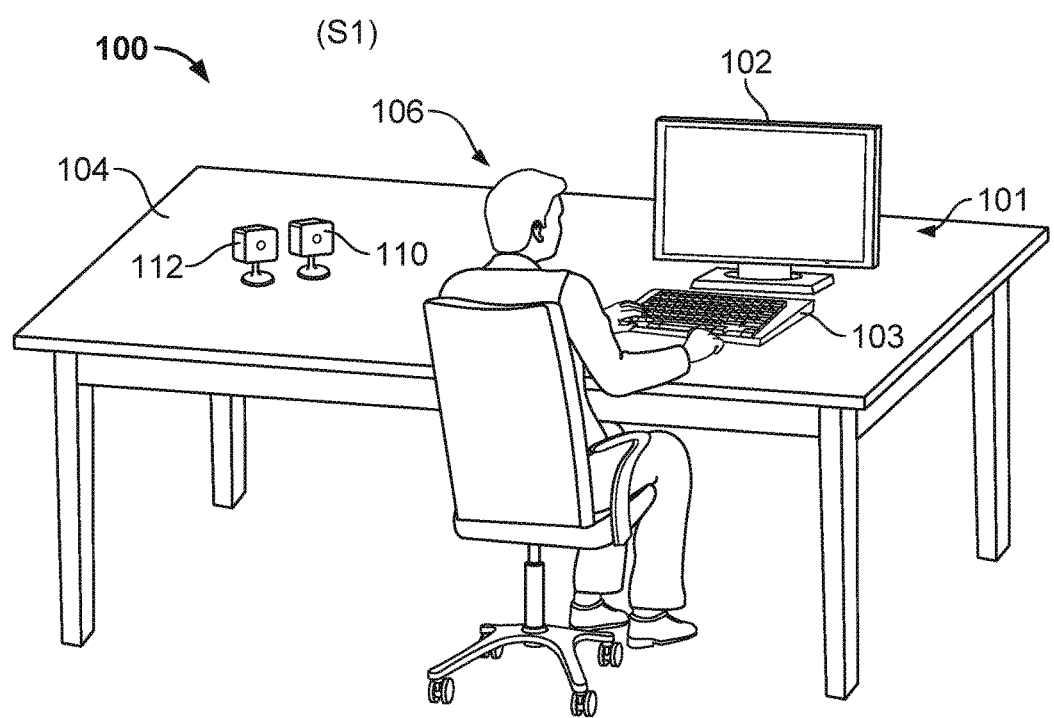
FIG. 1 illustrates an environment and system in a first scenario (S1) wherein techniques of the present disclosure may be applied.

FIG. 1 illustrates an environment and system 100 in a first scenario (S1) wherein techniques of the present disclosure may be applied. Note FIG. 1 is shown for illustrative purposes only, and is not meant to limit the scope of the present disclosure to any particular applications shown. In alternative exemplary embodiments, the multi-camera diagnostic and switching techniques disclosed herein may readily be applied to scenario types other than the first scenario (S1), as will be further described hereinbelow.

In FIG. 1, user 106 interacts with computing device 101 that includes computing hardware (not shown in FIG. 1), display 102, and keyboard 103. Computing device 101 is further coupled to first camera 110 and second camera 112, both cameras configured to capture image data from the environment of user 106 as shown. In an exemplary embodiment, cameras 110, 112 may directly provide images to a visual display, e.g., display 102 of personal computing device 101, to display the camera views. Note the coupling between cameras 110, 112 and the computing device 101 may be accomplished using electrical cabling (not shown in FIG. 1) or wirelessly, as will be clear to one of ordinary skill in the art.

Figure 2:
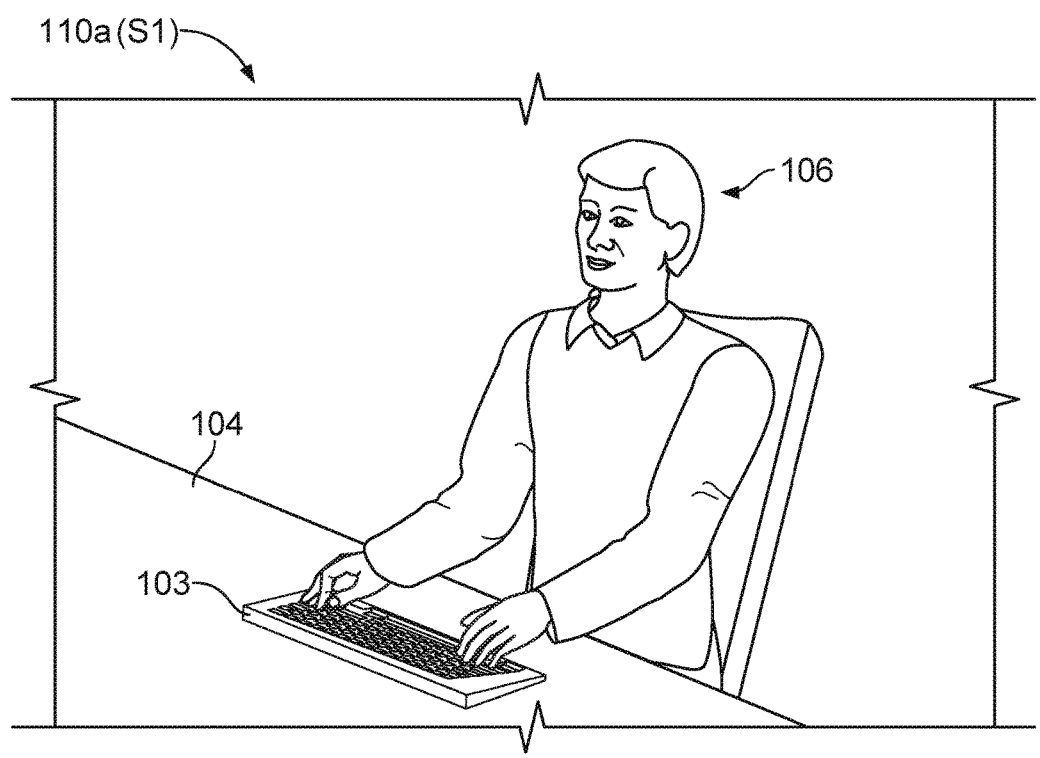
FIGS. 2 and 3 illustrate exemplary camera views of first scenario S1 by the first and second cameras in FIG. 1.
Figure 3:
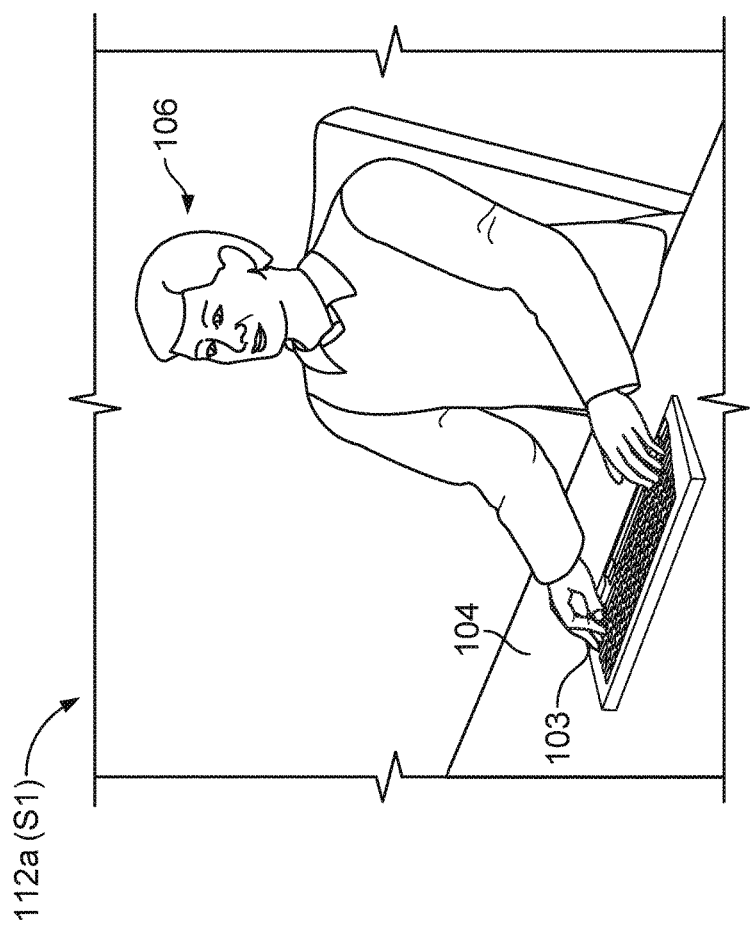

FIGS. 2 and 3 illustrate exemplary camera views of first scenario S1 by cameras 110, 112 in FIG. 1. Note the images are shown for illustrative purposes only, and are not meant to limit the scope of the present disclosure. In particular, FIG. 2 shows first camera view 110a(S1) corresponding to an image captured by first camera 110 in first scenario S1. Note first camera view 110a(S1) includes a front view of user 106, a portion of table surface 104, and keyboard 103. FIG. 3 shows second camera view 112a(S1) corresponding to an image captured by second camera 112 in first scenario S1. Camera view 112a(S1) also includes a front view of user 106, a portion of table surface 104, and keyboard 103. Note the aspect ratio of camera view 110a(S1) may differ from that of camera view 112a (S1), depending on the individual characteristics of cameras 110, 112.

In an exemplary embodiment, cameras 110, 112 may be components of a target recognition, analysis, and/or tracking system capable of analyzing and extracting data from the captured images. For example, such a system may recognize and process gestures and/or other movements performed by user 106 to derive input commands or cues for the computing device 101. It will also be appreciated that the techniques disclosed herein are generally applicable to any type of system incorporating multiple cameras, e.g., video surveillance systems.

Various modifications to the system 100 will further be clear to one of ordinary skill in the art, and are contemplated to be within the scope of the present disclosure. For example, in alternative exemplary embodiments, peripheral devices such as the keyboard 103 may be omitted. The field of view of cameras 110, 112 need not include a user 106, and may instead include other objects to be monitored, e.g., indoor or outdoor scenes, including traffic or crowd scenarios, etc. Cameras 110, 112 may be physically remote from the display 102 shown to an operator of the system, and such systems may be utilized in, e.g., telerobotic or remote sensing applications. Such alternative exemplary embodiments are contemplated to be within the scope of the present disclosure.

It will be appreciated that the provision of two or more cameras advantageously affords diversity of camera views to the system 100. For example, first camera 110 and second camera 112 may provide two different views of a single scene to aid image processing algorithms running on computing device 101 in reliably extracting information from the scene. Furthermore, first camera 110 and second camera 112 may jointly provide a greater field of view to the system than is possible with only one camera. In alternative exemplary embodiments (not shown), it will be appreciated that more than two cameras may readily be accommodated using the techniques of the present disclosure.

Note the physical layout and configuration of cameras 110, 112 shown in FIG. 1 are shown for illustrative purposes only, and are not meant to limit the scope of the present disclosure to any particular layout or configuration shown. For example, in alternative exemplary embodiments, first camera 110 and second camera 112 may be spaced apart at a considerably greater distance than suggested in FIG. 1. Furthermore, while cameras 110, 112 are shown as being placed on top of a table surface 104 in FIG. 1, it will be appreciated that the placement of the cameras generally need not be so restricted.

Figure 4:
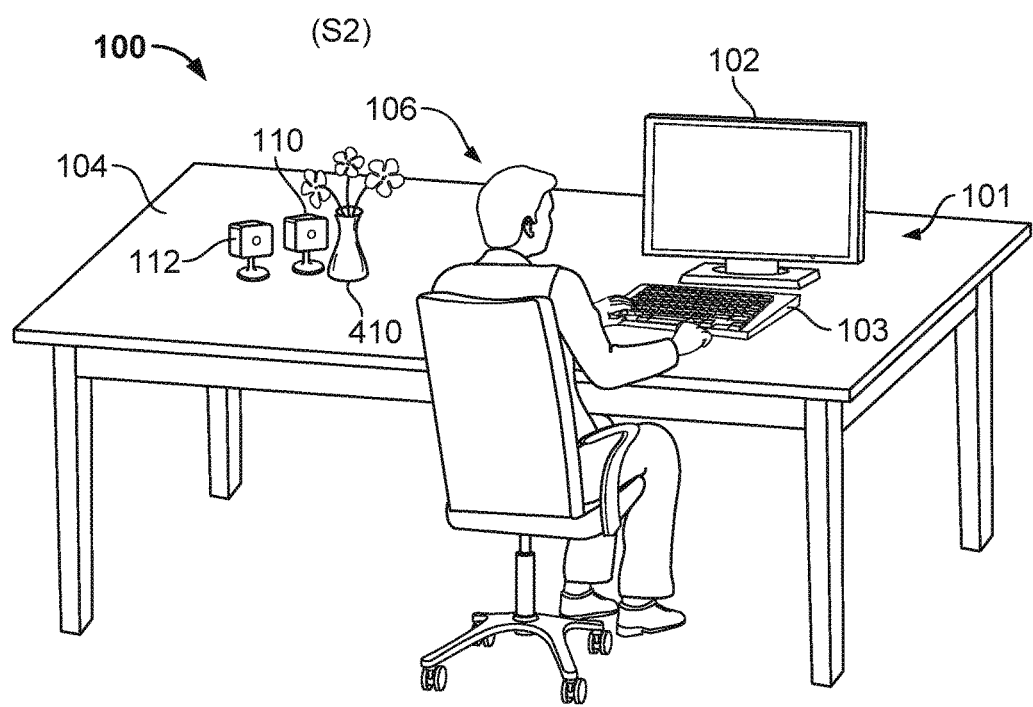
FIG. 4 illustrates a second scenario (S2) for the system, wherein an occlusion is present and partially blocking the field of view of the first camera.
Figure 5:
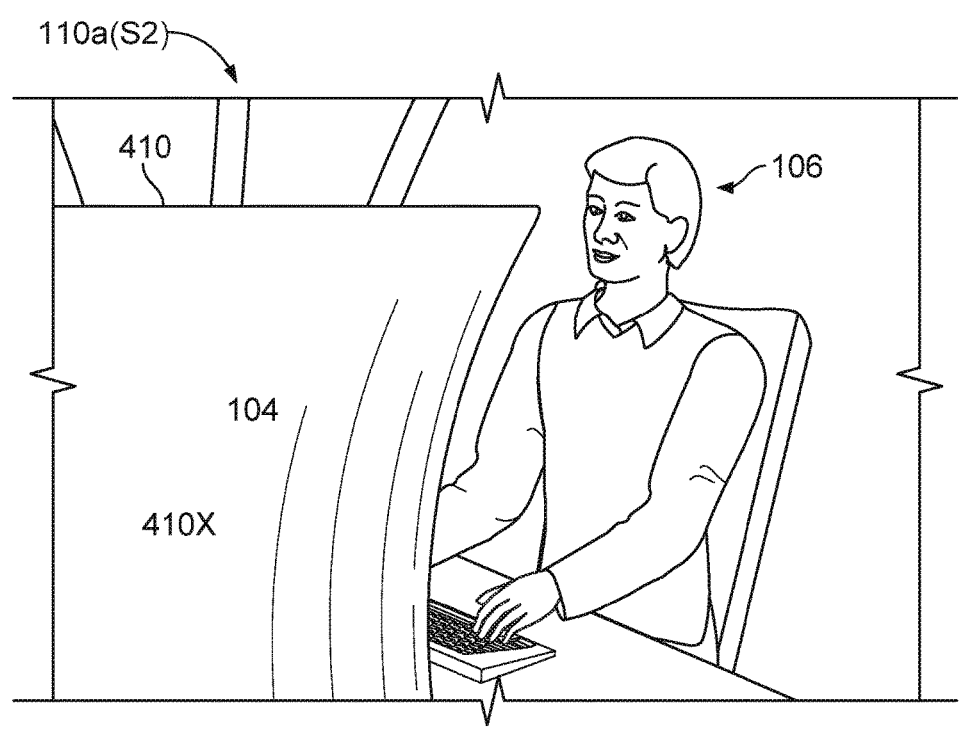
FIGS. 5 and 6 illustrate exemplary camera views of second scenario S2 by the first and second cameras in FIG. 4.
Figure 6:
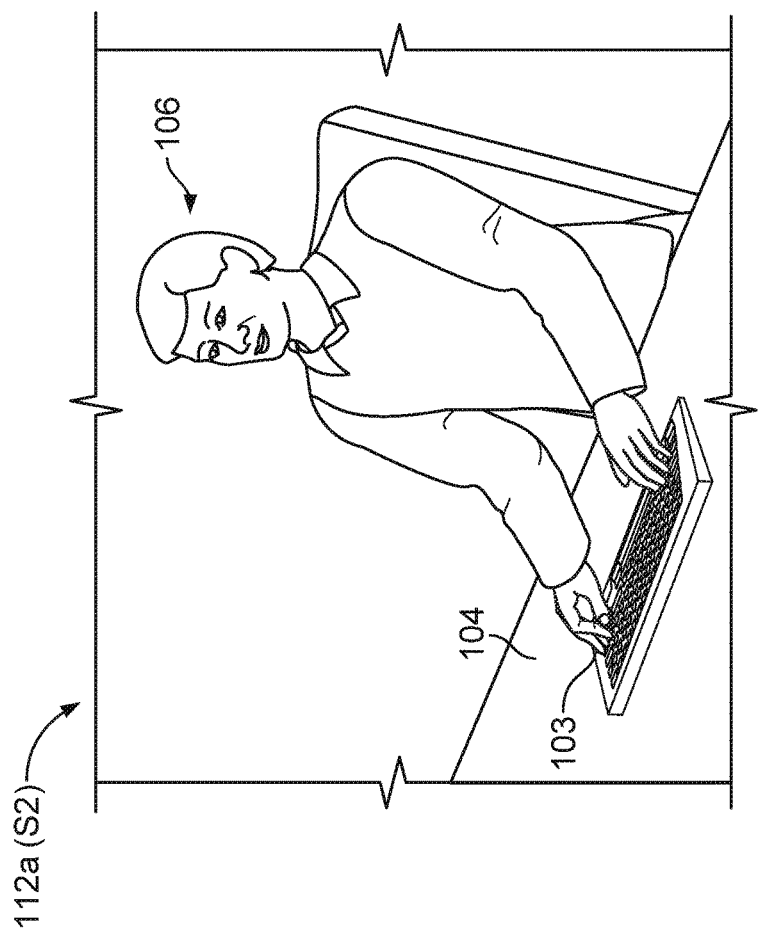

In certain situations, one or more cameras of a multi-camera system may provide a less-than-optimal image of a scene compared to another camera. For example, an occlusion may be present in the field of view of a first camera, blocking the view of the first camera and thereby restricting the useful information available from the first camera view. Simultaneously, the field of view of a second camera may be substantially free of such occlusion. For example, FIG. 4 illustrates a second scenario (S2) for the system 100, wherein an occlusion 410 (illustratively shown as a flower vase in FIG. 4) is present, partially blocking the field of view of first camera 110. Accordingly, as shown in FIG. 5, the first camera view 110a(S2) of first camera 110 includes a field of view having a substantial portion 410x blocked by occlusion 410 shown in FIG. 4. On the other hand, the second camera view 112a(S2) of second camera 112 shown in FIG. 6 is not blocked by occlusion 410. Thus in this scenario, the second camera view 112a obtained by second camera 112 may be considered more optimal than the first camera view 110a obtained by first camera 110.

Figure 7:
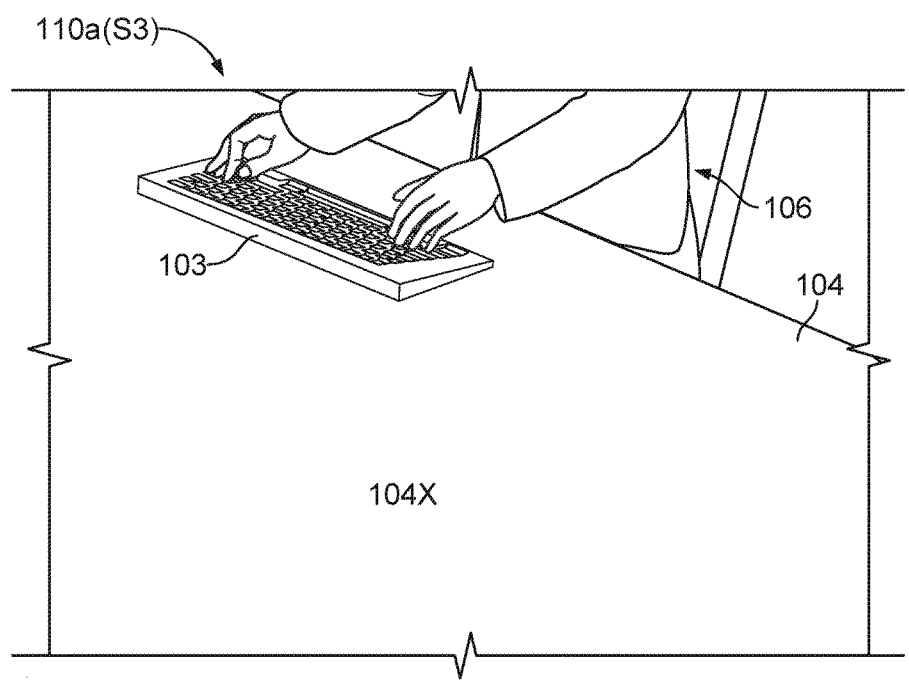
FIG. 7 illustrates a camera view of the first camera wherein a table surface undesirably occupies a substantial portion of the camera view.

It will be appreciated that occlusions present in a camera field of view generally need not be attributable to specific objects such as illustrated in FIG. 4. Other sources of occlusions may derive from, e.g., the table surface 104 occluding a camera field of view due to, e.g., the camera angle being tilted too far downward. Such a scenario S3 (not explicitly illustrated in the figures) might result, e.g., in the camera view of FIG. 7, showing a camera view 110a(S3) of first camera 110 wherein table surface 104 undesirably occludes a substantial portion 104x of the camera view.

Furthermore, one or more cameras of the system may possess certain capabilities specifically rendering such cameras more optimal for capturing images in certain situations. For example, if one of the cameras is an infrared (IR) camera, then the image captured by such IR camera(s) may be more optimal than that captured by a non-IR camera of the system under low-light conditions. In alternative scenarios, one or more of the cameras may more optimally process images than other cameras given certain environmental conditions. For example, local environmental conditions (e.g., temperature, humidity, presence of fog, etc.) at multiple cameras may substantially differ given their physical separations from each other, thus rendering one or more of the cameras more optimal in a given situation.

Accordingly, it would be desirable to provide techniques allowing the system to automatically detect a less-than-optimal view associated with at least one camera of a multi-camera system, and further to provide techniques for accommodating such scenarios in the multi-camera system.

Figure 8:
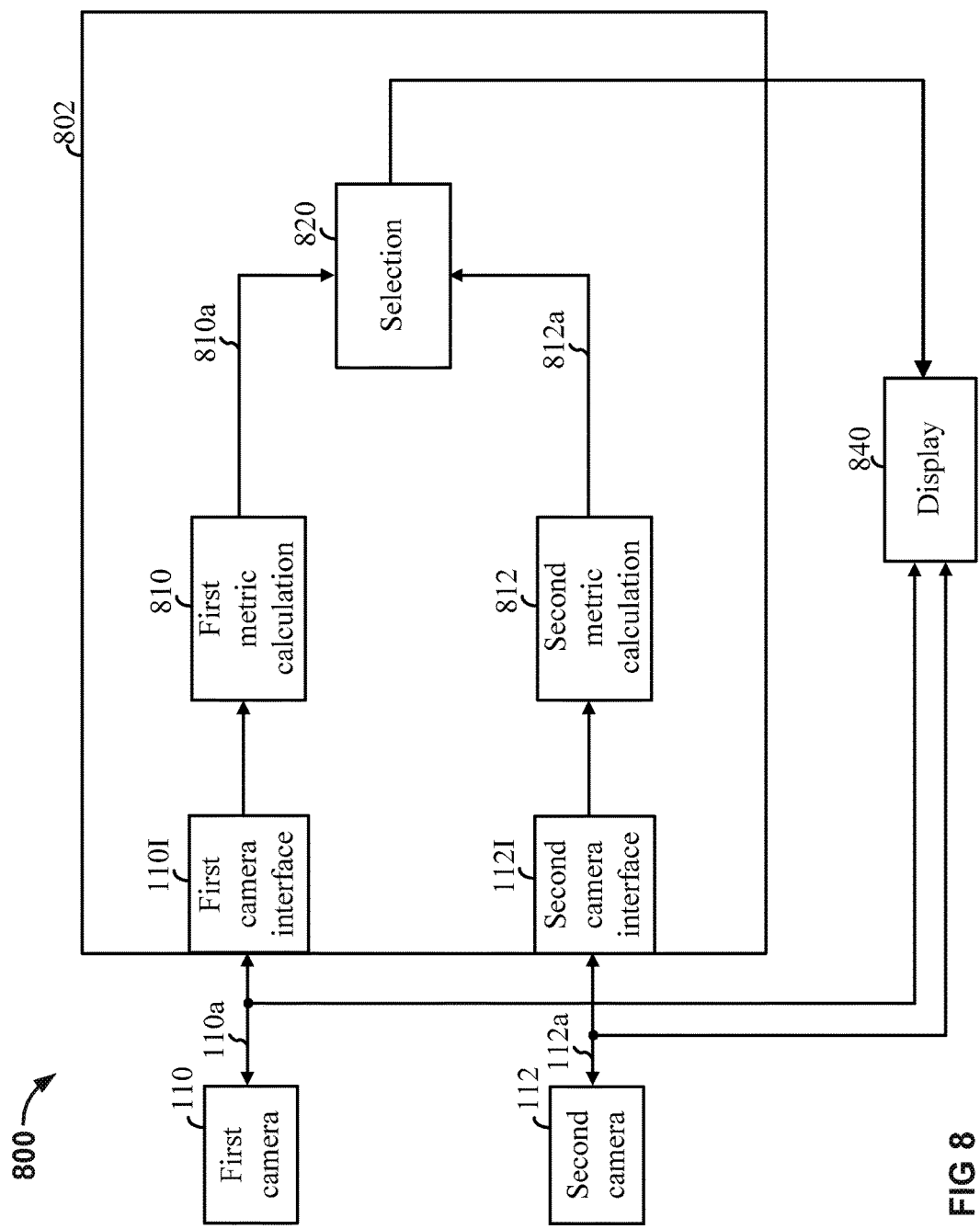
FIG. 8 illustrates a block diagram of a multi-camera system accommodating techniques of the present disclosure.

FIG. 8 illustrates a block diagram 800 of a multi-camera system accommodating techniques of the present disclosure. Note block diagram 800 of FIG. 8 is shown for illustrative purposes only, and is not meant to limit the scope of the present disclosure to systems accommodating two cameras. It will be appreciated that more than two cameras may readily be accommodated using the techniques of the present disclosure.

In FIG. 8, first camera 110 and second camera 112 are coupled to controller block 802 via first camera interface 110I and second camera interface 112I, respectively. In an exemplary embodiment, interfaces 110I, 112I may correspond to mechanical or electrical interfaces for receiving electrical cables carrying first camera signal 110b and second camera signal 112b, which may include signal representations of first and second camera views 110a, 112a, respectively.

In an alternative exemplary embodiment, interfaces 110I, 112I may correspond to wireless modules configured to wirelessly receive image data from cameras 110, 112. In yet alternative exemplary embodiments, first camera 110 and second camera 112 may be integrated in a single apparatus with controller block 802, and thus first camera interface 110I and second camera interface 112I may simply correspond to internal logical interfaces. It will be appreciated that interface modules for receiving image signals derived from cameras are known in the art, and the scope of the present disclosure encompasses all such interface modules. In certain exemplary embodiments, interfaces 110I, 112I may be bidirectional in nature, e.g., the controller block 802 may further transmit signals to cameras 110, 112 over interfaces 110I, 112I to control image capture parameters associated with the respective cameras.

Controller block 802 further includes first metric calculation block 810 coupled to first interface 110I, and second metric calculation block 812 coupled to second interface 112I. In particular, first metric calculation block 810 may use the first camera signal 110b supplied by first camera 110 to calculate one or more metrics corresponding to a sensed condition of first camera view 110a. For example, block 810 may calculate a brightness metric, saturation metric, contrast metric, depth metric, occlusion metric, and/or other metric(s) associated with a characteristic of the scene in first camera view 110a, according to principles known in the art. Alternatively, block 810 may calculate other metrics associated with first camera 110 or first camera view 110a, e.g., signals indicating error conditions such as power failure of first camera 110, etc. Similarly, second metric calculation block 812 may perform similar operations on second camera signal 112b derived from second camera 112. Blocks 810, 812, which collectively may be denoted the metric calculation block 805, generate signal outputs 810a, 812a containing the calculated metrics.

In certain exemplary embodiments, the first and/or second camera 110, 112 may provide independently calculated indications of depth to controller block 802 to assist in or in lieu of metric calculation as performed by blocks 810, 812.

In particular, either or both of cameras 110, 112 need not be a traditional sensor array. In certain exemplary embodiments, a "camera," as the term is used in the present disclosure, may implement an active light cancellation mechanism, such that different parts of a pixel surface gather light in different ways, and the differential signal being reported for each pixel. Accordingly, such a "camera" need not be capable of generating a signal that is directly suitable for display without further processing. In such an exemplary embodiment, post-processing algorithms known in the art may be applied to the output of such a camera to nevertheless render the generated signal suitable for display. Such alternative exemplary embodiments are contemplated to be within the scope of the present disclosure.

In an alternative exemplary embodiment, a "camera" may incorporate a laser that scans across a field of view using a MEMS (micro-electrical mechanical system) device, e.g., via a tilted mirror, and a single detector that measures the time delay for each laser pulse. In this exemplary embodiment, depth data may be recorded as a list of XYZ points which may not necessarily fit into a rectilinear array. Accordingly, it will be understood that in this disclosure and in the claims, the term "camera" encompasses devices that solely generate image signals for visual display, as well as devices that additionally or exclusively generate metrics (e.g., depth, brightness, or other metrics) associated with an image view. Such alternative exemplary embodiments are contemplated to be within the scope of the present disclosure.

Signal outputs 810a, 812a are coupled to selection block 820 for further processing. In particular, selection block 820 may assess the information derived from signal outputs 810a, 812a to determine which camera view should be displayed by a display 840 coupled to controller block 802. Selection block 820 may determine that metrics provided in signal outputs 810a, 812a fulfill a condition (also denoted herein as a "detected condition") indicating that the view of one camera is less optimal than the view of another camera, or other anomalous condition. For example, in an exemplary embodiment, a brightness metric in signal 810a associated with first camera 110 may indicate that the first camera view 110a is less optimal than the second camera view 112a, based on, e.g., further comparison with a brightness metric in signal 812a.

In an exemplary embodiment, responsive to determining that first camera view 110a is less optimal than second camera view 112a, block 820 may further instruct display 840 via display control signal 802a to display the second camera view 112a on display 840. In this instance, selection block 820 may employ a "select-better-view" strategy for selecting the camera view to be displayed by display 840. In an alternative exemplary embodiment, responsive to a determination that first camera view 110a is less optimal than second camera view 112a, selection block 820 may instruct display 840 to display first camera view 110a. In this instance, block 820 may employ a "flag-diagnostic-view" strategy for selecting the camera view to be displayed by display 840. Yet other alternative exemplary embodiments, e.g., incorporating alternative strategies for selecting camera views, will be clear to one of ordinary skill in the art in light of the present disclosure, and such alternative exemplary embodiments are contemplated to be within the scope of the present disclosure.

It will be appreciated that the functions described herein may be implemented in software, e.g., using software algorithms to calculate metrics and determine whether conditions are fulfilled, and to implement the strategies for camera view selection. Alternatively, the functions may also be implemented in hardware, e.g., dedicated application-specific circuitry (ASIC's) may be programmed to calculate metrics and perform determinations and selection as described herein. Hybrid software and hardware implementations are also contemplated to be within the scope of the present disclosure.

In an exemplary embodiment, the first camera interface 110I may correspond to an infrared camera interface for receiving an infrared camera signal associated with an infrared camera view. The second camera interface 112I may correspond to a color camera interface for receiving a color camera signal associated with a color camera view. The metric calculation block 805 may be configured to calculate an infrared brightness metric and a depth metric from the infrared camera signal, such as described hereinbelow with reference to FIG. 12. The selection block 820 may be configured to generate a display control signal indicating selection of the infrared camera view if the infrared brightness metric is above a saturation threshold, or if the depth metric is below a proximity threshold, such as described hereinbelow with reference to FIG. 13. Note in alternative exemplary embodiments, however, first and second cameras 110, 112 generally need not correspond to color and infrared cameras, and may correspond to any type or combination of multiple cameras.

Figure 9:
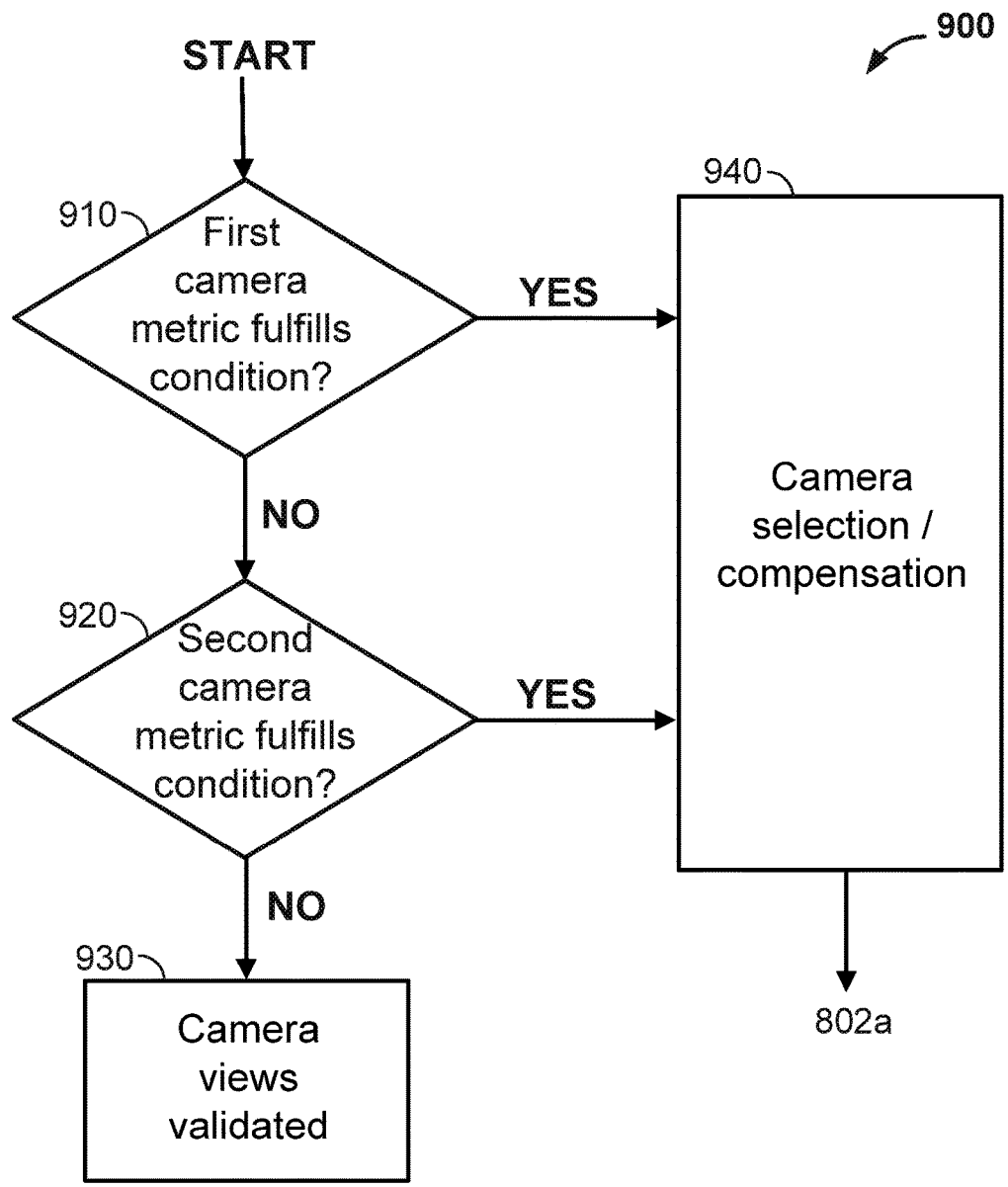
FIG. 9 illustrates an exemplary embodiment of a generalized method that may be employed by the selection block.

FIG. 9 illustrates an exemplary embodiment of a generalized method 900 that may be employed by selection block 820. Note the method 900 of FIG. 9 is shown for illustrative purposes only, and is not meant to limit the scope of the present disclosure to any particular method shown.

In FIG. 9, at block 910, it is determined whether a first camera metric associated with first camera 110 fulfills a detected condition signaling that the first camera view is less than optimal. If the detected condition is fulfilled (corresponding to a determination of "YES"), then the method proceeds to block 940. If the detected condition is not fulfilled (corresponding to a determination of "NO"), then the method proceeds to block 920. In an exemplary embodiment, the detected condition may correspond to, e.g., whether a metric in signal 810a is detected to exceed a first threshold.

For example, in an exemplary embodiment wherein signal output 810a includes a brightness metric indicative of the overall brightness of first camera view 110a, then such brightness metric being greater than a predetermined threshold may indicated that first camera view 110a is saturated. In this particular instance, the detected condition would be fulfilled by the brightness metric being greater than the predetermined threshold. Alternative techniques for generating and comparing metrics related to the view of a camera may be known in the art, and certain exemplary embodiments will be further described hereinbelow in the present disclosure. All such exemplary embodiments are contemplated to be within the scope of the present disclosure.

At block 920, it is determined whether a second camera metric associated with second camera 112 fulfills a detected condition. If YES, then the method proceeds to block 940. If NO, then the method proceeds to block 930. In an exemplary embodiment, the second camera metric may correspond to, e.g., the result of comparing a metric in signal 812a to a second threshold, in a similar manner as described for block 910 hereinabove. Note the detected conditions for the first and second camera metrics need not be the same. For example, threshold values for the first and second camera metrics may be different. Furthermore, the first camera metric may be a different type of metric from the second camera metric. For example, the first camera metric may be a brightness metric, while the second camera metric may be a depth metric.

At block 930, assuming neither the first camera metric nor the second camera metric fulfills the respective detected conditions, both camera views are assumed to be validated, and appropriate action may be taken responsive thereto. For example, in an exemplary embodiment, when both camera views are validated, then the camera view associated with the higher resolution camera may be selected for display. Alternatively, both camera views may be simultaneously displayed.

At block 940, appropriate camera selection and/or compensation actions may be performed in response to detecting that the first camera metric and/or the second camera metric fulfills the detected condition. In certain exemplary embodiments, actions performed at block 940 may correspond to selecting an appropriate view to be displayed, e.g., according to a "select-better-view," "flag-diagnostic-view," or other type of strategy as further described herein. An output signal indicating the chosen camera view may be provided as display control signal 802a, which may in turn be coupled to select the camera view for a display (not shown in FIG. 9).

Note while blocks 910 and 920 are depicted as following each other sequentially in FIG. 9, it will be appreciated that alternative exemplary embodiments may implement the computations in blocks 910 and 920 in parallel. For example, the determination of whether the first camera metric fulfills a detected condition and whether the second camera metric fulfills a detected condition may both be performed concurrently, and the joint determinations evaluated by block 940 to select a particular camera view for display. Such concurrent evaluation may be utilized in, e.g., a multi-dimensional approach to determine whether a detected condition is fulfilled by a plurality of metrics, as further described hereinbelow with reference to FIGS. 14-16. Similarly, concurrent metric calculation and condition evaluation may be performed in the exemplary embodiments described with reference to FIGS. 10-13. Such alternative exemplary embodiments are contemplated to be within the scope of the present disclosure.

Figure 10:
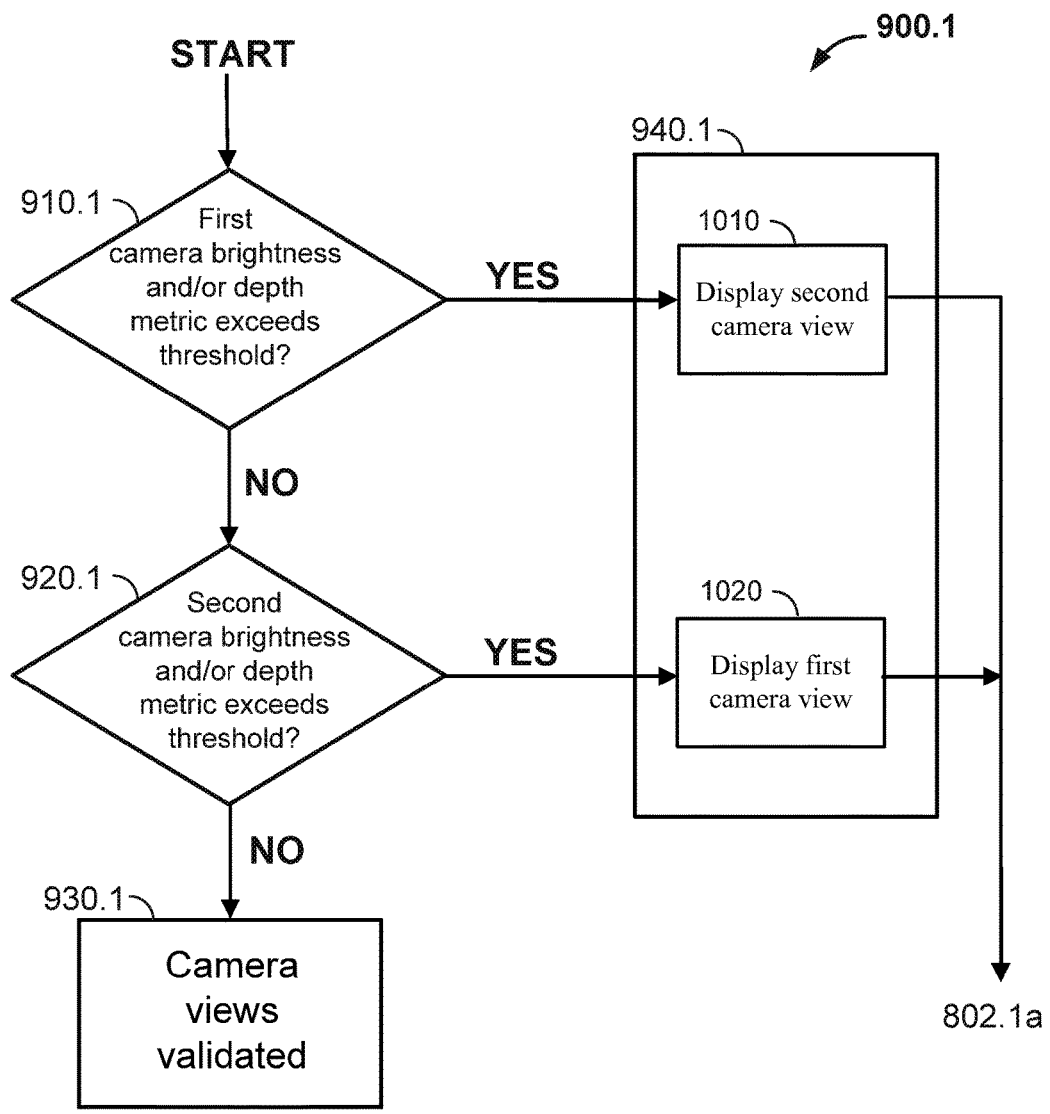
FIG. 10 illustrates an exemplary embodiment of a method in which a "select-better-view" strategy is implemented.

FIG. 10 illustrates an exemplary embodiment 900.1 of generalized method 900 shown in FIG. 9, in which a "select-better-view" strategy is implemented. For the purposes of FIG. 10, each of blocks 810 and 812 of FIG. 8 is assumed to calculate a camera brightness metric and/or a depth metric associated with each camera view. Accordingly, at block 910.1 of FIG. 10, it is determined whether the first camera brightness and/or depth metric exceeds a predetermined threshold. Note in this specification and in the claims, the term "exceed" will be understood in the sense of "going beyond" a threshold, and thus may denote either the value of a metric being more positive, i.e., greater, than a threshold, or less positive, i.e., less, than a threshold, depending on the specific application design. If YES, then the method proceeds to block 1010 of block 940.1. If NO, then the method proceeds to block 920.1.

In FIG. 10, it will be appreciated that a determination of "YES" at block 910.1 may correspond to an instance wherein the first camera view is determined to be less-than-optimal for display. For example, if a brightness metric indicates the first camera view is too dark, then it might be inferred that the first camera view is not optimal. Or, if the brightness metric indicates that the first camera view is too bright or has too many saturated pixels, then it might be inferred that the first camera view contains a significant occlusion. Alternatively, or in conjunction, if a depth metric for the first camera view exceeds a threshold, corresponding to a scenario wherein an object is too close to the first camera and thereby obstructs the first camera view, then it might alternatively or in conjunction be inferred that the first camera view contains a significant occlusion.

At block 920.1, it is determined whether the second camera brightness and/or depth metric exceeds a predetermined threshold. If YES, then the method proceeds to block 1020 of block 940.1. If NO, then the method proceeds to block 930.1. It will be appreciated that similar inferences may be made with respect to the determination of "YES" at block 920.1 for the second camera view, as described with reference to the first camera view at block 910.1 hereinabove.

In FIG. 10, block 940.1 corresponds to a specific exemplary embodiment of camera selection/compensation block 940 illustrated in FIG. 9. Note the specific implementation 940.1 of block 940 is shown for illustrative purposes only, and is not meant to limit the scope of the present disclosure to any particular implementations of block 940.

In particular, at block 1010 within block 940.1, responsive to the first camera brightness and/or depth metric being determined to exceed a threshold at block 910.1, a second camera view is chosen for display. Similarly, at block 1020 within 940.1, responsive to the second camera brightness and/or depth metric being determined to exceed a threshold at block 920.1, a first camera view is chosen for display. In both cases, an output signal indicating the chosen display may be provided as display control signal 802.1*a*, which may in turn be coupled to, e.g., a display (not shown in FIG. 10).

Per the description hereinabove, it will be appreciated that the "select-better-view" strategy selects for display the camera view determined to have better or more optimal characteristics as determined from one or more calculated metrics.

Figure 11:
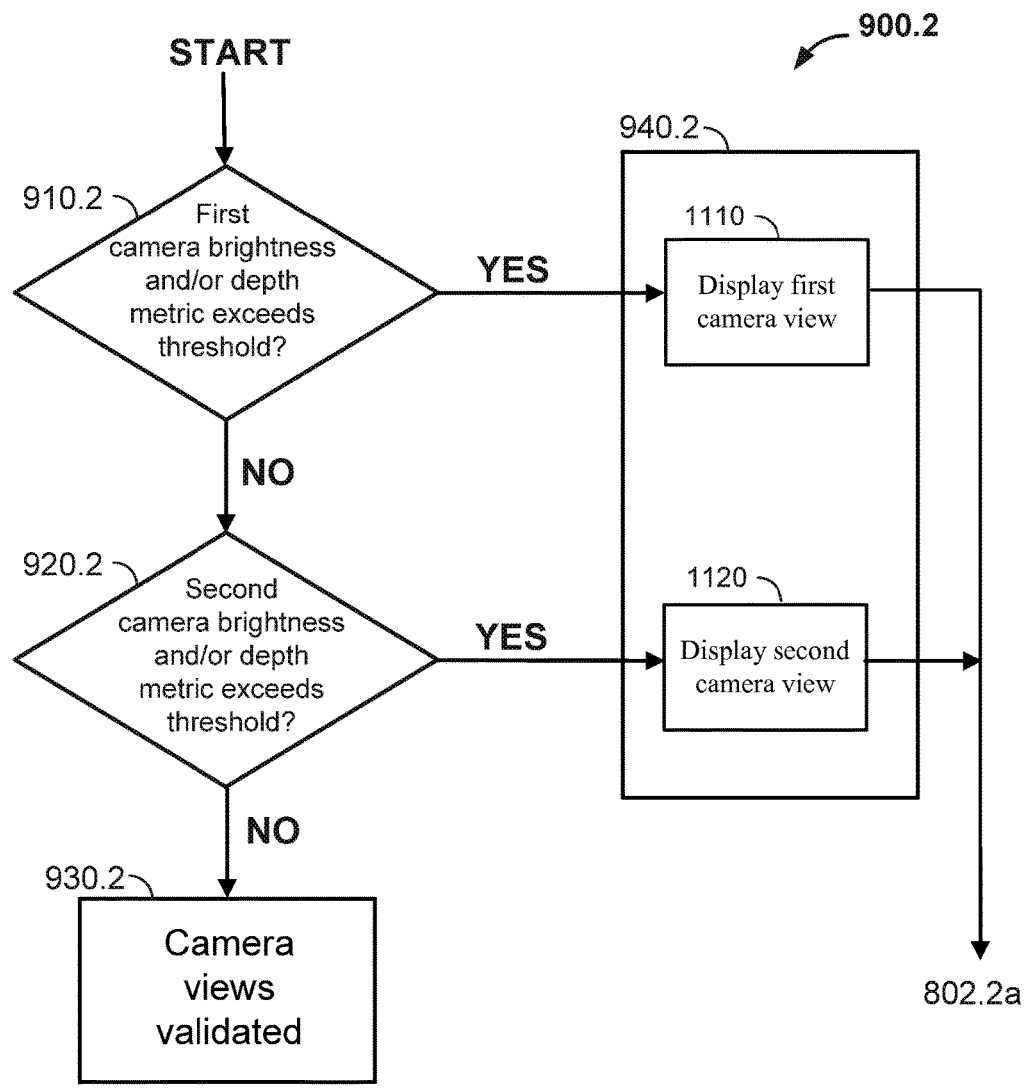
FIG. 11 illustrates an exemplary embodiment of a method in which a "flag-diagnostic-view" strategy is implemented.

FIG. 11 illustrates an alternative exemplary embodiment 900.2 of generalized method 900 shown in FIG. 9, in which a "flag-diagnostic-view" strategy is implemented. At block 910.2, it is determined whether the first camera brightness and/or depth metric exceeds a predetermined threshold. If YES, then the method proceeds to block 1110 of block 940.2. If NO, then the method proceeds to block 920.2. At block 920.2, it is determined whether the second camera brightness and/or depth metric exceeds a predetermined threshold. If YES, then the method proceeds to block 1120 of block 940.2. If NO, then the method proceeds to block 930.2.

In FIG. 11, block 940.2 corresponds to a specific exemplary embodiment of camera selection/compensation block 940 implementing a "flag-diagnostic-view" strategy. In particular, at block 1110 within block 940.2, responsive to the first camera brightness and/or depth metric being determined to exceed a threshold at block 910.2, the first camera view is chosen for display. Similarly, at block 1120 within 940.2, responsive to the second camera brightness and/or depth metric being determined to exceed a threshold at block 920.1, the second camera view is chosen for display. In both cases, an output signal indicating the chosen display may be provided as display control signal 802.2*a*, which may in turn be coupled to, e.g., a display (not shown in FIG. 11).

Per the description hereinabove, it will be appreciated that the "flag-diagnostic-view" strategy selects for display the camera view for which an occlusion or other non-optimality is determined to be present. In such instances, a user of the system may thereby be alerted to the presence of the problem by being shown the non-optimal camera view on the display. Accordingly, the user may, e.g., take appropriate actions to remove the occlusion or make other adjustments to restore normal functioning of the system.

Figure 12:
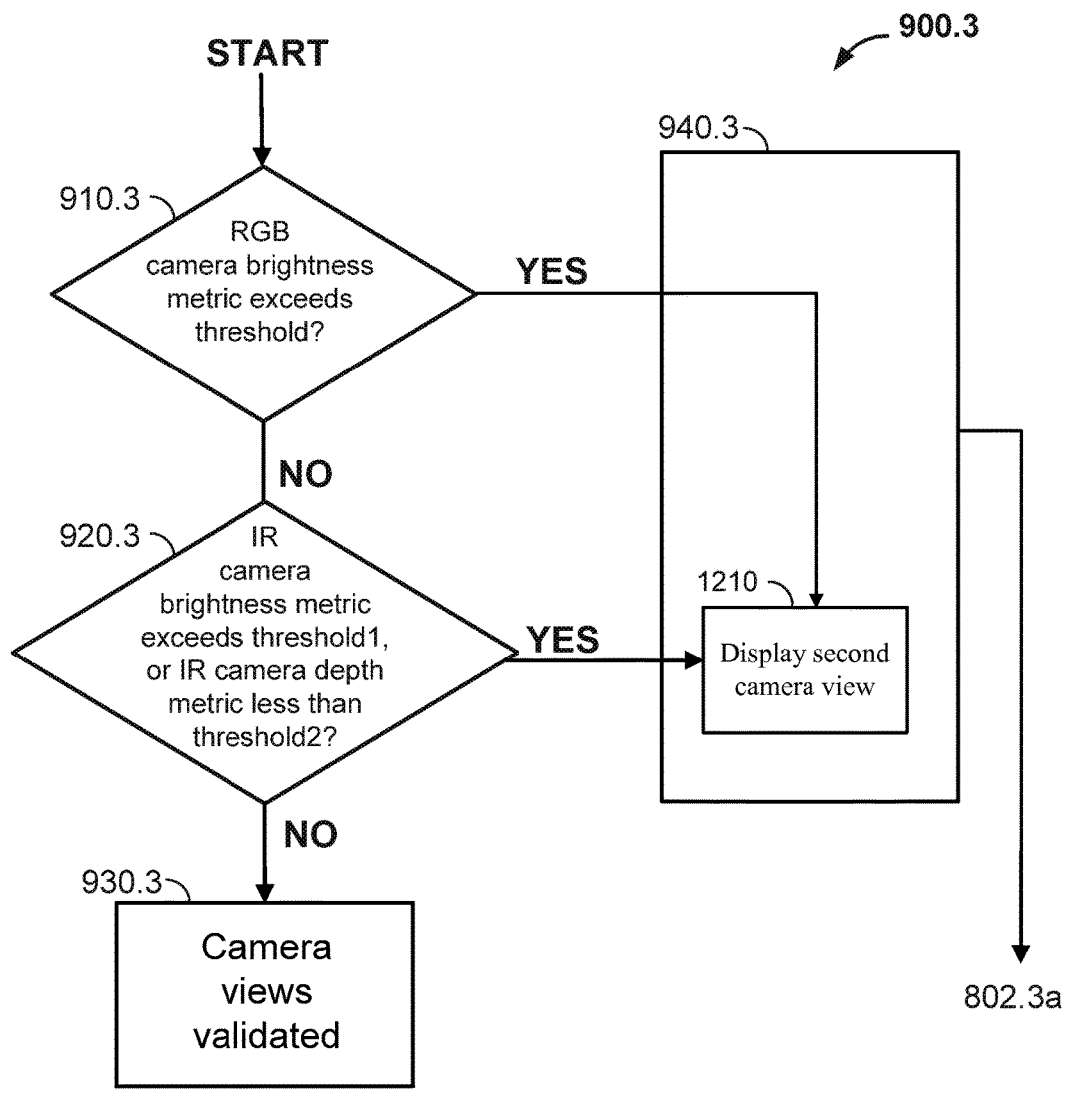
FIG. 12 illustrates an exemplary embodiment of a method implementing an alternative strategy for selecting camera views.

FIG. 12 illustrates an exemplary embodiment 900.3 of a method implementing an alternative strategy for selecting camera views. The method 900.3 is configured for operation with, e.g., a system 800 in which first camera 110 corresponds to a color (or "RGB") camera, and second camera 112 corresponds to an infrared (or "IR") camera. In particular, an RGB camera may be a color camera known in the art for capturing color images of a scene. An IR camera may be an infrared camera, also known in the art, sensitive to infrared radiation that can capture infrared images of a scene. In this exemplary embodiment, the first and second camera signals may be denoted the color and infrared camera signals, respectively.

It will be appreciated that an IR camera may advantageously permit image capture under conditions of low lighting, albeit in some embodiments at a lower pixel resolution than compared to an RGB camera. In certain exemplary embodiments, the IR camera may also be equipped with an active IR illumination mechanism. By actively illuminating a scene with IR radiation, the IR camera may advantageously enhance the quality of IR camera views. The active IR illumination mechanism may further provide depth sensing capabilities to the IR camera according to principles known in the art. For example, the relative phases of outgoing and incoming (reflected) IR radiation from the active illumination mechanism may be correlated to determine the distance of an object from the IR camera.

In FIG. 12, at block 910.3, it is determined whether the RGB camera brightness metric (or "color brightness metric") exceeds a predetermined threshold. If YES, then the method proceeds to block 1210 of block 940.3. If NO, then the method proceeds to block 920.3. At block 920.3, it is determined whether the IR camera brightness metric (or "infrared brightness metric") and/or depth metric exceeds a predetermined threshold. If YES, then the method also proceeds to block 1210 of block 940.3. If NO, then the method proceeds to block 930.3.

In FIG. 12, block 940.3 is a specific exemplary embodiment of camera selection/compensation block 940 implementing a "select-IR-view" strategy according to the present disclosure. In particular, at block 1210 within block 940.3, responsive to any of the metrics calculated for the RGB or IR camera at blocks 910.3 and 920.3 fulfilling the detected conditions, the IR camera view is chosen for display.

Per the description hereinabove, it will be appreciated that the "select-IR-view" strategy always selects for display the IR camera view in case an anomalous condition, e.g., occlusion or saturation, is detected. One motivation for this strategy is to ensure that anomalous conditions arising from the IR camera are always flagged for user attention. This may be advantageous in certain exemplary embodiments wherein, e.g., due to its depth sensing and/or other enhanced capabilities, proper IR camera functioning should be given higher priority over proper RGB camera functioning.

Figure 13:
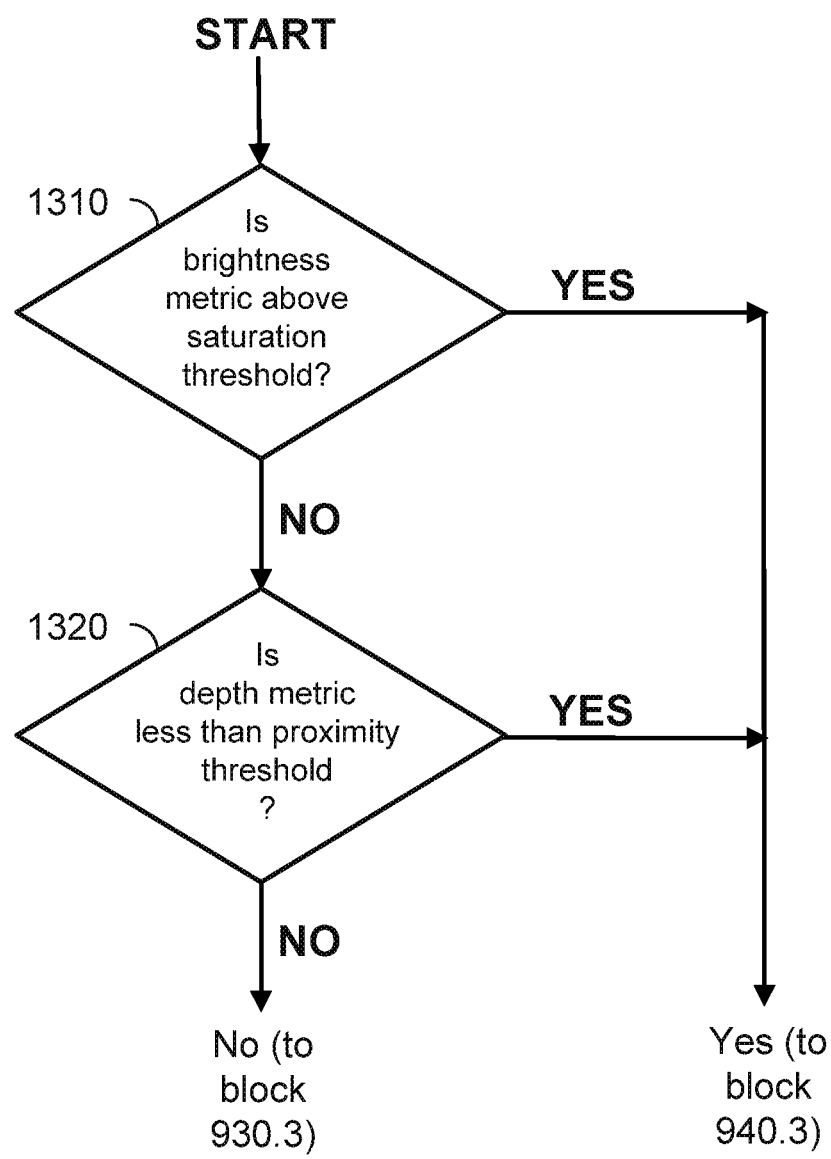
FIG. 13 illustrates an exemplary embodiment of processing that may be performed by an IR camera to derive brightness and depth metrics.

FIG. 13 illustrates an exemplary embodiment of processing that may be performed by an IR camera to derive brightness and depth metrics, e.g., as described with reference to block 920.3 of FIG. 12. Note FIG. 13 is shown for illustrative purposes only, and is not meant to limit the scope of the present disclosure to any particular techniques for calculating brightness or depth metrics.

In FIG. 13, at block 1310, a determination is made of whether a given IR image frame is saturated above a threshold. In an exemplary embodiment, to make this determination, a brightness value for each pixel of the IR frame may be collected and compared with a predetermined brightness saturation threshold. If more than a certain percentage (e.g., 50%) of the total pixels in the IR frame have a brightness value exceeding the saturation threshold, then such frame may be determined to be "saturated," and a "YES" determination may be made at block 1310. Note in certain exemplary embodiments, per the determination of a frame being saturated, subsequent depth calculations for such a frame may also be deemed invalid, and accordingly depth calculation such as performed at block 1320 (described hereinbelow) may effectively be bypassed when block 1310 returns "YES."

It will be appreciated that the brightness calculation techniques described at block 1310 may readily be applied to calculate corresponding metrics for a color (RGB) or other type of camera as well. Further note one of ordinary skill in the art may readily derive alternative techniques for determining that a brightness of a frame is above a threshold, e.g., calculations may be performed on groups of pixels rather than individual pixels, etc. Such alternative exemplary embodiments are contemplated to be within the scope of the present disclosure.

If block 1310 returns "NO," then the processing proceeds to block 1320. At block 1320, it is determined whether the depth metric is less than a proximity threshold, possibly indicating the presence of a near obstruction. In an exemplary embodiment, the IR camera may be equipped with an active mechanism for shining infrared laser light onto a field of view of the IR camera, and for sensing at each pixel the active IR light that is reflected from objects within the field of view. For example, if an object in an image is far away, then less reflected IR light may be detected at the corresponding IR sensors than if an object is close by. In an exemplary embodiment, a depth metric includes a count of the number of pixels for which the detected depth is below a predetermined threshold (e.g., a "shallow count"). For example, a depth is calculated for each pixel of the IR frame, and a determination of "YES" may be generated at block 1320 if, e.g., if the shallow count is more than a predetermined shallowness threshold.

Note various techniques for range imaging cameras are known in the art, e.g., techniques associated with time-of-flight cameras and laser reflection (e.g., LIDAR) systems, and such techniques may readily be incorporated in exemplary embodiments of the present disclosure. It will further be appreciated that depth calculation techniques need not be performed with the active IR illumination mechanism described herein, nor need they be restricted only to applications wherein at least one of the cameras is an infrared camera. For example, in certain alternative exemplary embodiments, stereo depth sensing techniques incorporating, e.g., triangulation methods employing two or more cameras to sense the depth of occlusions in the fields of view. Such alternative exemplary depth calculation techniques are contemplated to be within the scope of the present disclosure.

Figure 14:
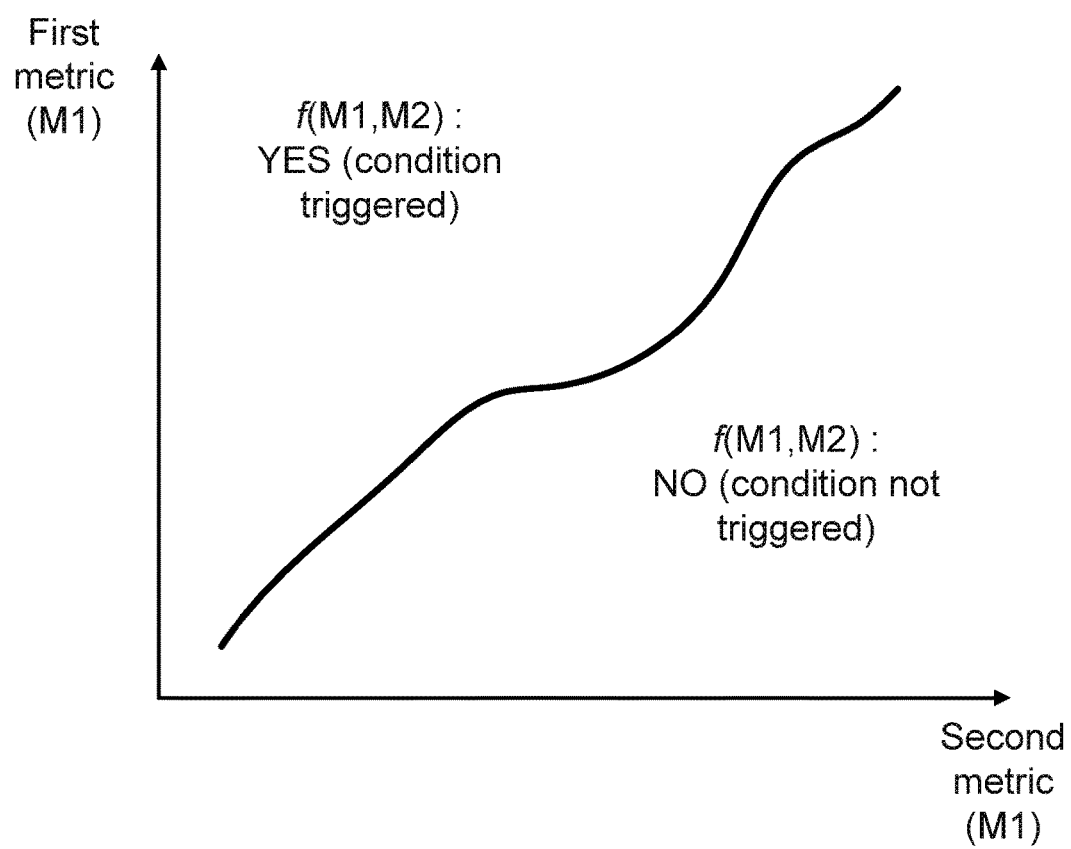
FIG. 14 illustrates an alternative exemplary embodiment, wherein a multi-dimensional approach is employed to determine whether a detected condition is fulfilled by a plurality of metrics.

FIG. 14 illustrates an alternative exemplary embodiment, wherein a multi-dimensional approach is employed to determine whether a detected condition is fulfilled by a plurality of metrics. In FIG. 14, a first metric having an associated value M1 is plotted against a second metric having an associated value M2. A function $f$ may be defined that maps a specific combination of M1 and M2 to a result, e.g., a binary indication of "YES" or "NO" depending on the values of M1, M2. In an exemplary embodiment, this "YES" or "NO" result may determine whether a detected condition is fulfilled. In response to generating this result, a specific camera view may be selected per a camera view selection strategy such as described hereinabove.

In an exemplary embodiment, both the first and second metrics may be associated with a single camera, e.g., an IR camera, and may correspond to, e.g., a brightness metric and a depth metric, respectively, of an IR camera. In an alternative exemplary embodiment, the first metric may be associated with a first camera, and the second metric may be associated with a second camera, etc. In yet another exemplary embodiment, more than two metrics may readily be accommodated. For example, a function $f$ may alternatively be defined that maps a specific combination of four metrics M1, M2, M3, M4 to a binary result. Such alternative exemplary embodiments are contemplated to be within the scope of the present disclosure.

One of ordinary skill in the art will appreciate that the particular instance of function $f$ in FIG. 14 is shown for illustrative purposes only, and is not meant to limit the scope of the present disclosure to any particular form for $f$. For example, in certain exemplary embodiments, the region of the M1–M2 space mapped to a determination of "YES" by $f$ need not be connected, and/or the boundary line dividing "YES" and "NO" need not be smooth. In certain exemplary embodiments, the particular functional mapping $f$ may be derived from empirical data, e.g., a plurality of scenarios with known occlusion and/or brightness characteristics along with corresponding values of M1, M2 may be collected and classified to derive $f$.

Figure 15:
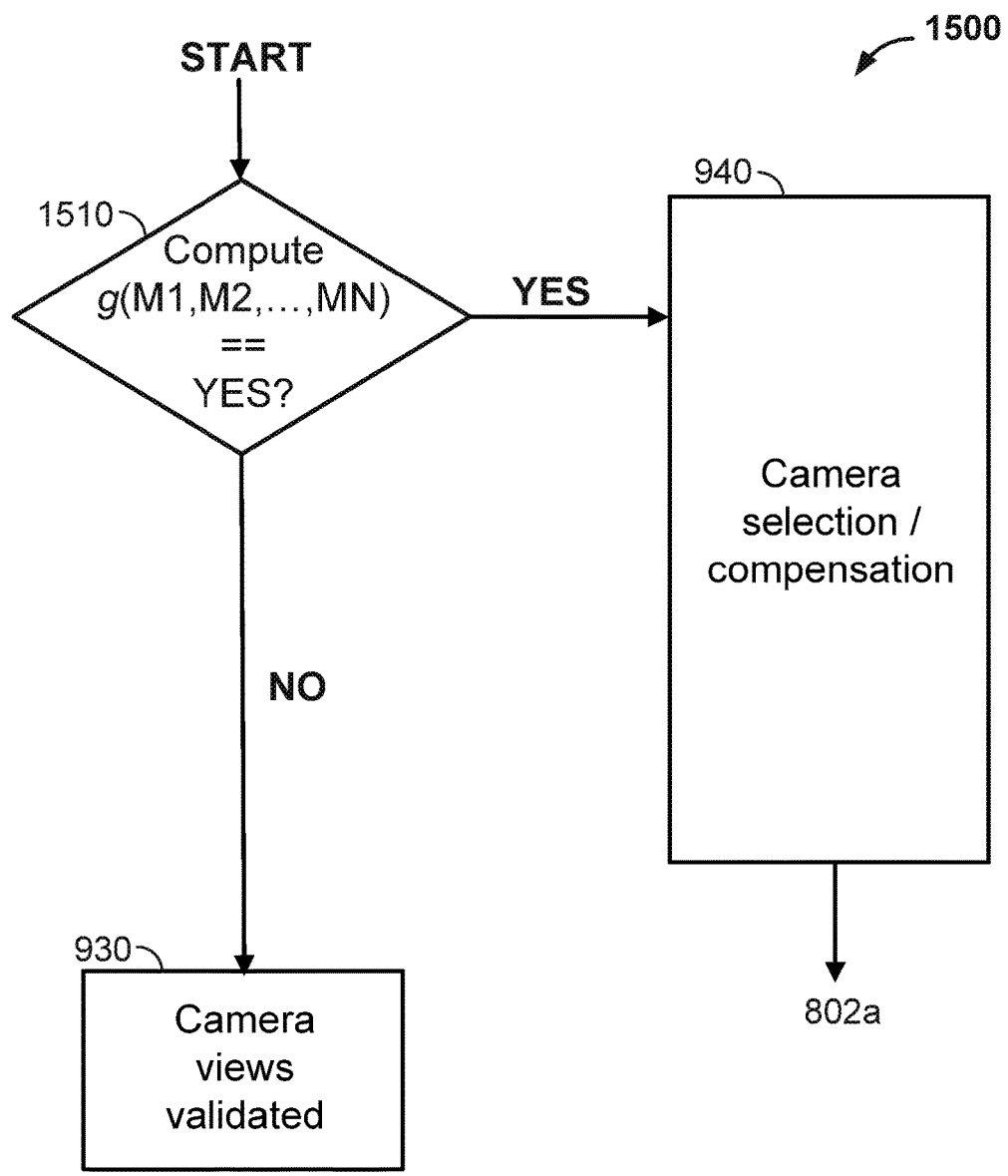
FIG. 15 illustrates an exemplary embodiment of a method for processing N camera metrics that may be employed by the selection block.

FIG. 15 illustrates an exemplary embodiment of a generalized method 1500 for processing N camera metrics that may be employed by selection block 820. In FIG. 15, a plurality N of camera metrics M1 through MN are provided as inputs to decision block 1510. Block 1510 computes a function g (M1, . . . , MN) on the N camera metrics to determine an output of "YES" or "NO," corresponding to whether a detected condition is fulfilled or not fulfilled, respectively. In an exemplary embodiment, the computation at block 1510 may be performed according to an N-dimensional generalization of the function shown in FIG. 14, e.g., a region of an N-dimensional space corresponding to the N camera metrics may correspond to "condition fulfilled," while another region may correspond to "condition not fulfilled." In FIG. 15, it will be seen that blocks 930 and 940 may perform operations identical to those described hereinabove for those blocks, e.g., in FIGS. 10-12.

Figure 16:
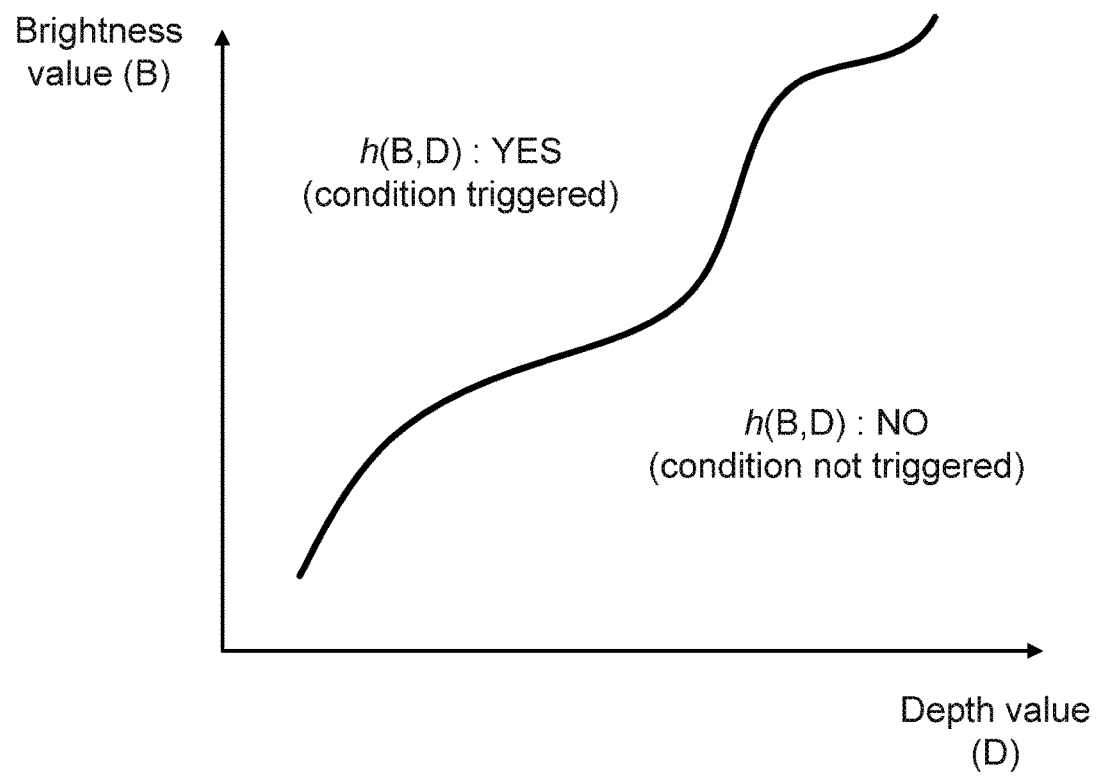
FIG. 16 illustrates an exemplary embodiment of a particular functional specification h mapping combinations of a brightness metric (B) and a depth metric (D) to the determination of a detected condition.

FIG. 16 illustrates an exemplary embodiment of a particular functional specification h mapping combinations of a brightness metric (B) and a depth metric (D) to the determination of a detected condition. In particular, combinations of B and D wherein B is high (e.g., corresponding to high brightness) and D is low (e.g., corresponding to a near occlusion) may be assigned to a determination of "YES" according to h, while other combinations of B and D may be assigned to a determination of "NO." It will be appreciated that the sample functional mapping is shown for illustrative purposes only, and other functional mappings will be apparent in light of the present disclosure.

Figure 17:
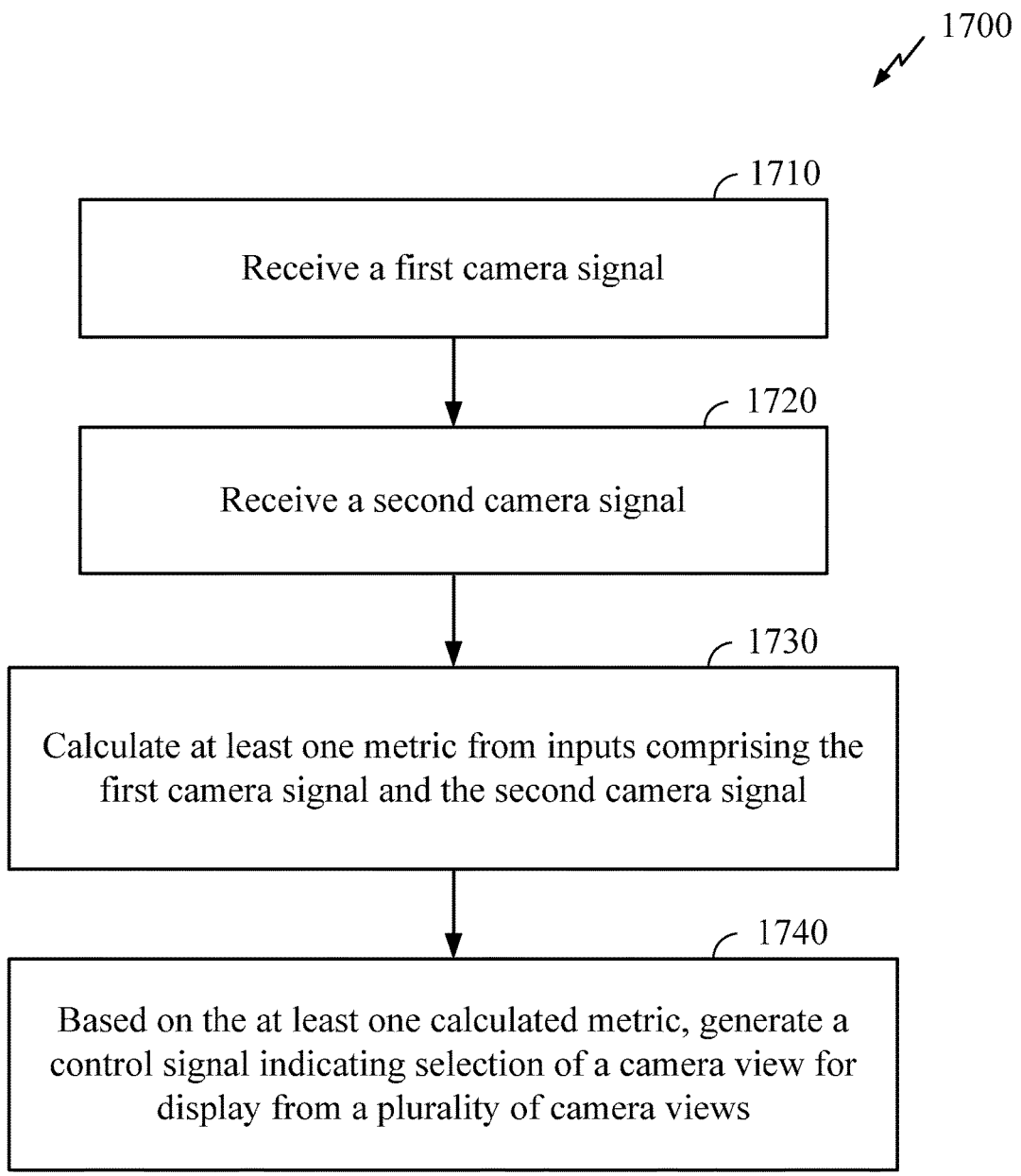
FIG. 17 illustrates an exemplary embodiment of a general method for selecting a camera view.

FIG. 17 illustrates an exemplary embodiment of a general method 1700 according to the present disclosure. At block 1710, a first camera signal is received. At block 1720, a second camera signal is received. At block 1730, at least one metric is calculated from inputs comprising the first camera signal and the second camera signal. At block 1740, based on the at least one calculated metric, a control signal is generated indicating selection of a camera view for display from a plurality of camera views.

In an exemplary embodiment, metric calculation and condition detection may further be enhanced by correlating camera views with each other to perform image registration, according to principles known in the art.

While certain exemplary embodiments have been described wherein the computation of camera metrics is used to select a particular camera view for display, other exemplary embodiments need not be so limited. For example, in alternative exemplary embodiments, the computed camera metrics need not be used in selecting a particular camera view for display. Rather, the computed camera metrics may be used for other internal calculations performed by the system, e.g., computing an error condition to be flagged to the user, in a manner other than selecting a particular camera view for display. For example, a determined error condition may be signaled to the user via appropriate text on the display, or provided as a warning to the user via audio beeps, etc. Such alternative exemplary embodiments are contemplated to be within the scope of the present disclosure.

Figure 18:
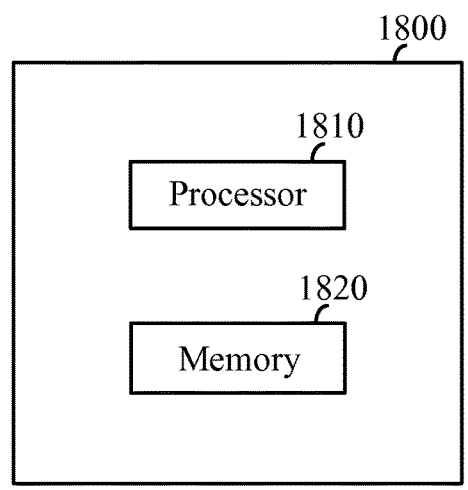
FIG. 18 schematically shows a non-limiting computing system that may perform one or more of the above described methods and processes.

FIG. 18 schematically shows a non-limiting computing system 1800 that may perform one or more of the above described methods and processes. Computing system 1800 is shown in simplified form. It is to be understood that virtually any computer architecture may be used without departing from the scope of this disclosure. In different embodiments, computing system 1800 may take the form of a mainframe computer, server computer, desktop computer, laptop computer, tablet computer, home entertainment computer, network computing device, mobile computing device, mobile communication device, gaming device, etc.

Computing system 1800 includes a processor 1810 and a memory 1820. Computing system 1800 may optionally include a display subsystem, communication subsystem, sensor subsystem, camera subsystem, and/or other components not shown in FIG. 18. Computing system 1800 may also optionally include user input devices such as keyboards, mice, game controllers, cameras, microphones, and/or touch screens, for example.

Processor 1810 may include one or more physical devices configured to execute one or more instructions. For example, the processor may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The processor may include one or more processors that are configured to execute software instructions. Additionally or alternatively, the processor may include one or more hardware or firmware logic machines configured to execute hardware or firmware instructions. Processors of the processor may be single core or multicore, and the programs executed thereon may be configured for parallel or distributed processing. The processor may optionally include individual components that are distributed throughout two or more devices, which may be remotely located and/or configured for coordinated processing. One or more aspects of the processor may be virtualized and executed by remotely accessible networked computing devices configured in a cloud computing configuration.

Memory 1820 may include one or more physical devices configured to hold data and/or instructions executable by the processor to implement the methods and processes described herein. When such methods and processes are implemented, the state of memory 1820 may be transformed (e.g., to hold different data).

Memory 1820 may include removable media and/or built-in devices. Memory 1820 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Memory 1820 may include devices with one or more of the following characteristics: volatile, nonvolatile, dynamic, static, read/write, read-only, random access, sequential access, location addressable, file addressable, and content addressable. In some embodiments, processor 1810 and memory 1820 may be integrated into one or more common devices, such as an application specific integrated circuit or a system on a chip.

Memory 1820 may also take the form of removable computer-readable storage media, which may be used to store and/or transfer data and/or instructions executable to implement the herein described methods and processes. Removable computer-readable storage media 1830 may take the form of CDs, DVDs, HD-DVDs, Blu-Ray Discs, EEPROMs, and/or floppy disks, among others.

It is to be appreciated that memory 1820 includes one or more physical devices that stores information. The terms "module," "program," and "engine" may be used to describe an aspect of computing system 1800 that is implemented to perform one or more particular functions. In some cases, such a module, program, or engine may be instantiated via processor 1810 executing instructions held by memory 1820. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

In an aspect, computing system 1800 may correspond to a computing device including a memory 1820 holding instructions executable by a processor 1810 to receive a first camera signal associated with a first camera view, receive a second camera signal associated with a second camera view, calculate at least one metric from inputs comprising the first camera signal and the second camera signal, and generate a display control signal indicating selection of a camera view for display from a plurality of camera views based on the at least one calculated metric. Note such a computing device will be understood to correspond to a process, machine, manufacture, or composition of matter.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. An apparatus comprising:
    a first camera interface for receiving a first camera signal associated with an infrared camera view;
    a second camera interface for receiving a second camera signal associated with a color camera view;
    a metric calculation block configured to calculate at least one of an infrared brightness metric and a depth metric from the first camera signal, the infrared brightness metric indicating brightness of infrared light received at the infrared camera view; and
    a selection block configured to generate a display control signal indicating selection of the infrared camera view for display in the presence of an obstruction in the infrared camera view, the infrared camera view selected for display if the infrared brightness metric is higher than a brightness threshold or if the depth metric is lower than a depth threshold.

2. The apparatus of claim 1, the metric calculation block further configure to calculate a color brightness metric from the second camera signal.

3. The apparatus of claim 2, the display control signal indicating selection of the infrared camera view for display if the color brightness metric is lower than a threshold.

4. The apparatus of claim 2, the display control signal further indicating selection of the infrared camera view for display if the color brightness metric is higher than a brightness threshold.

5. The apparatus of claim 2, the control signal indicating selection of the infrared camera view for display if a function performed on at least one of the infrared brightness metric, the depth metric, and the color brightness metric indicates a detected condition is fulfilled.

6. The apparatus of claim 1, further comprising a first camera coupled to the first camera interface, a second camera coupled to the second camera interface, and a display coupled to the control signal, the display configured to display the camera view selected by the selection block.

7. The apparatus of claim 1, further comprising a third camera interface for receiving a third camera signal associated with a third camera view.

8. A method comprising:
    receiving a first camera signal associated with an infrared camera view;
    receiving a second camera signal associated with a color camera view;
    calculating at least one of an infrared brightness metric and a depth metric from the first camera signal, the infrared brightness metric indicating the brightness of infrared light received at the infrared camera view; and
    generating a display control signal indicating selection of the infrared camera view for display in the presence of an obstruction in the infrared camera view, the infrared camera view selected for display if the infrared brightness metric is higher than a brightness threshold or if the depth metric is lower than a depth threshold.

9. The method of claim 8, further comprising calculating a color brightness metric from the second camera signal.

10. The method of claim 9, the control signal indicating selection of the infrared camera view for display if the color brightness metric is lower than a threshold.

11. The method of claim 9, the display control signal further indicating selection of the color camera view for display if the color brightness metric is higher than a brightness threshold.

12. The method of claim 9, the control signal indicating selection of the infrared camera view for display if a function performed on at least one of the infrared brightness metric, depth metric, and color brightness metric indicates a detected condition is fulfilled.

13. The method of claim 8, further comprising receiving a third camera signal associated with a third camera view.

14. An apparatus comprising:
    an infrared camera interface for receiving an infrared camera signal associated with an infrared camera view;
    a color camera interface for receiving a color camera signal associated with a color camera view;
    a metric calculation block configured to calculate an infrared brightness metric and a depth metric from the infrared camera signal, the depth metric comprising a count of number of pixels for which the detected depth is below a predetermined threshold, the infrared brightness metric indicating the brightness of infrared light received at the infrared camera view; and
    a selection block configured to generate a display control signal indicating selection of the infrared camera view for display in the presence of an obstruction in the infrared camera view, the infrared camera view selected for display if the infrared brightness metric is above a saturation threshold, or if the count is greater than a predetermined shallowness threshold.

* * * * *